(12) United States Patent
Dong et al.

(10) Patent No.: US 7,234,385 B2
(45) Date of Patent: Jun. 26, 2007

(54) RETURN TO NEUTRAL MECHANISM FOR HYDRAULIC PUMP

(75) Inventors: Xingen Dong, Farmington, CT (US); Frank P. Holzschuh, Greeneville, TN (US); Allen Burdette, Johnson City, TN (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 11/186,411

(22) Filed: Jul. 21, 2005

(65) Prior Publication Data

US 2006/0021339 A1    Feb. 2, 2006

Related U.S. Application Data

(60) Provisional application No. 60/590,390, filed on Jul. 21, 2004.

(51) Int. Cl.
*F01B 3/02* (2006.01)
(52) U.S. Cl. ............................................ 92/12.2
(58) Field of Classification Search ................. 92/12.2
See application file for complete search history.

(56) References Cited

U.S. PATENT DOCUMENTS

| | | | |
|---|---|---|---|
| 3,905,194 | A | 9/1975 | Reimer |
| 4,028,010 | A | 6/1977 | Hopkins |
| 4,236,422 | A | 12/1980 | Cochran et al. |
| 4,283,962 | A | 8/1981 | Forster |
| 4,584,926 | A | 4/1986 | Beck, Jr. et al. |
| 5,226,349 | A | 7/1993 | Alme et al. |
| 5,826,490 | A | 10/1998 | Madsen et al. |
| 5,845,559 | A | 12/1998 | Schroeder et al. |
| 6,068,451 | A | 5/2000 | Uppal |
| 6,378,300 | B1 * | 4/2002 | Johnson et al. ............... 60/487 |
| 6,487,857 | B1 | 12/2002 | Poplawski et al. |
| 6,715,284 | B1 | 4/2004 | Poplawski et al. |
| 6,782,797 | B1 | 8/2004 | Brandenburg et al. |

* cited by examiner

*Primary Examiner*—F. Daniel Lopez
(74) *Attorney, Agent, or Firm*—Renner, Otto, Boisselle & Sklar, LLP (57) ABSTRACT

A speed adjusting mechanism that includes a return to neutral feature for returning a control member of a pump to neutral after the control member has been moved to a forward or reverse position. The speed adjusting mechanism is characterized by the use of a torsion spring that enables the mechanism to be composed of just a few parts.

18 Claims, 4 Drawing Sheets

RETURN TO NEUTRAL MECHANISM FOR HYDRAULIC PUMP

RELATED APPLICATION

This application claims the benefit of U.S. Provisional Application No. 60/590,390 filed Jul. 21, 2004, which application is hereby incorporated herein by reference in its entirety.

FIELD OF THE INVENTION

The invention herein described relates generally to hydraulic pumps and more particularly to a return to neutral mechanism used therewith. The invention has particular applicability to piston pumps used in hydrostatic transmissions employed in axle driving apparatus such as zero-turn transaxles.

BACKGROUND

Transaxle and hydrostatic transmission assemblies are known in the art. Generally, a hydrostatic transmission assembly includes a rotating hydraulic pump and a rotating hydraulic motor. The hydraulic pump usually is a piston-type pump including a plurality of reciprocating pistons which are in fluid communication through hydraulic porting with the hydraulic motor. Rotation of the hydraulic pump against a moveable swash plate creates an axial motion of the pump pistons that forces hydraulic fluid through the hydraulic porting to the hydraulic motor to drive the motor. The rotation of the hydraulic motor may be used to drive a wheel axle of a riding lawn mower, small tractor and the like.

The position of the swash plate with respect to the hydraulic pump pistons can be changed to vary the speed and change the direction of rotation of the hydraulic motor and thus the speed and direction of rotation of the vehicle axle. The orientation with which the swash plate addresses the hydraulic pump pistons can be changed to control whether the hydraulic motor rotates in the forward direction or in the reverse direction. Additionally, the angle at which the swash plate addresses the hydraulic pump pistons can be changed to increase or decrease the amount of hydraulic fluid that is forced from the hydraulic pump to the hydraulic motor to change the speed at which the hydraulic motor rotates.

The position of the moveable swash plate typically is varied by rotating a trunnion arm that is coupled to the swash plate. The trunnion arm projects from the pump housing for coupling to a speed change lever or a speed change pedal of the vehicle through a cable, lever or other linkage. In this manner, movement of the speed change lever/pedal results in rotational movement of the trunnion arm to change the position of the swash plate to thereby control the speed and direction of the vehicle.

Return to neutral mechanisms heretofore have been used to cause the swash plate of the pump to assume a neutral position even after having been shifted to a forward and/or reverse position. The return to neutral mechanism is normally implemented as an integral part of the vehicle linkage.

In U.S. Pat. No. 6,782,797 there is disclosed a return to neutral mechanism that is adapted to be mounted to the casing of a hydraulic pump or hydrostatic transaxle. The mechanism is integrated into a speed adjusting mechanism that includes a return arm adapted to be mounted to the casing in a fixed position indicative of a neutral position of the trunnion arm coupled to the swash plate of the pump. Additionally, the speed adjusting mechanism includes a control arm that is mounted to and moves the trunnion arm. A pair of scissor return arms are provided that are adapted to move the control arm in cooperation with the return arm for the purpose of moving the trunnion arm to the neutral position. To provide mounting flexibility, the control arm is adapted to be mounted to the trunnion arm in any one of a plurality of different positions and the return arm is capable of being mounted to the casing in a corresponding position such that the return arm can be aligned with the control arm to establish the neutral position.

SUMMARY OF THE INVENTION

The present invention provides a hydraulic drive apparatus including a speed adjusting mechanism that includes a return to neutral feature for returning a control member of a pump to neutral after the control member has been moved to a forward or reverse position. The speed adjusting mechanism is characterized by the use of a torsion spring that enables the mechanism to be composed of just a few parts.

In accordance with the invention, a speed adjusting mechanism is provided for a hydraulic drive apparatus including a casing having a hydraulic pump mounted therein and a trunnion arm extending outside the casing and being rotatable for controlling the output of the pump. The speed adjusting mechanism comprises a return member mountable to the casing, a control arm connectable to the trunnion arm and movable between forward and reverse positions to move the trunnion arm between forward and reverse positions, respectively, and a torsion spring operatively coupled to the return member and the control arm for biasing and returning the control arm to a neutral position after the control arm has been moved to at least one of the forward or reverse positions.

More particularly, the return member includes at least one spring stop for preventing outward movement of at least one leg of the torsion spring when the control arm is rotated in a first direction while permitting inward movement of the at least one leg of the torsion spring when the control arm is rotated in a second direction opposite the first direction. The spring stop can be a slot in the return member through which the at least one leg of the torsion spring extends. The control arm includes at least one abutment for engaging and urging at least one spring leg of the torsion spring to cause it to move inwardly against the biasing force of the torsion spring when the control arm is rotated in a first direction.

In a preferred embodiment, a speed adjusting mechanism is provided with unidirectional return to neutral functionality wherein the torsion spring biases and returns the control arm to neutral after the control arm is rotated in a first direction, and wherein the control arm can rotate independent of the torsion spring when rotated in a second direction opposite the first direction.

In another preferred embodiment, the return member includes first and second spring stops. The first spring stop is configured to prevent outward movement of a first leg of the torsion spring and the second spring slot is configured to permit inward movement of a second leg of the torsion spring when the control arm is rotated in a first direction. Conversely, when the control arm is rotated in a second direction opposite the first direction, the first spring stop is configured to permit inward movement of the first leg of the torsion spring and the second stop is configured to prevent outward movement of the second leg of the torsion spring.

The control arm includes laterally spaced apart first and second of abutments, referred to as ears, for engaging and urging the first and second legs of the torsion spring when the control member is rotated. The first abutment is configured to engage and urge the first leg of the torsion spring to cause it to move inwardly against the biasing force of the torsion spring when the control arm is rotated in a first direction. The second abutment configured to engage and urge the second leg of the torsion spring to cause it to move inwardly against the biasing force of the torsion spring when the control arm is rotated in a second direction opposite the first direction.

The foregoing and other features of the invention are hereinafter described in detail in conjunction with the accompanying drawings which set forth an exemplary embodiment illustrating one of the various ways in which the principles of the invention may be employed.

DETAILED DESCRIPTION

Figure 1:
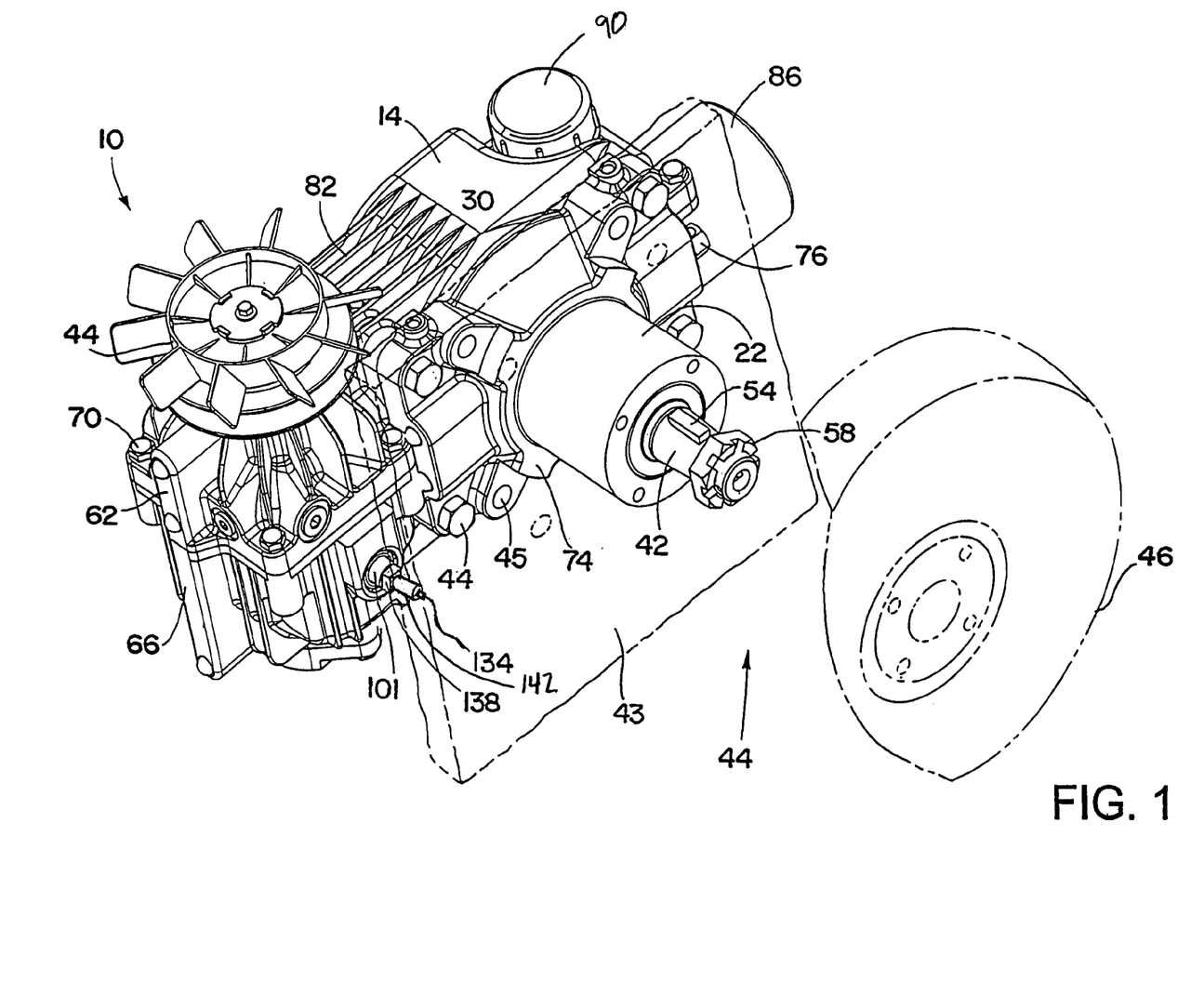
FIG. 1 is a perspective view of an exemplary hydraulic drive apparatus with which can be used a speed control mechanism corresponding to the present invention.
Figure 2:
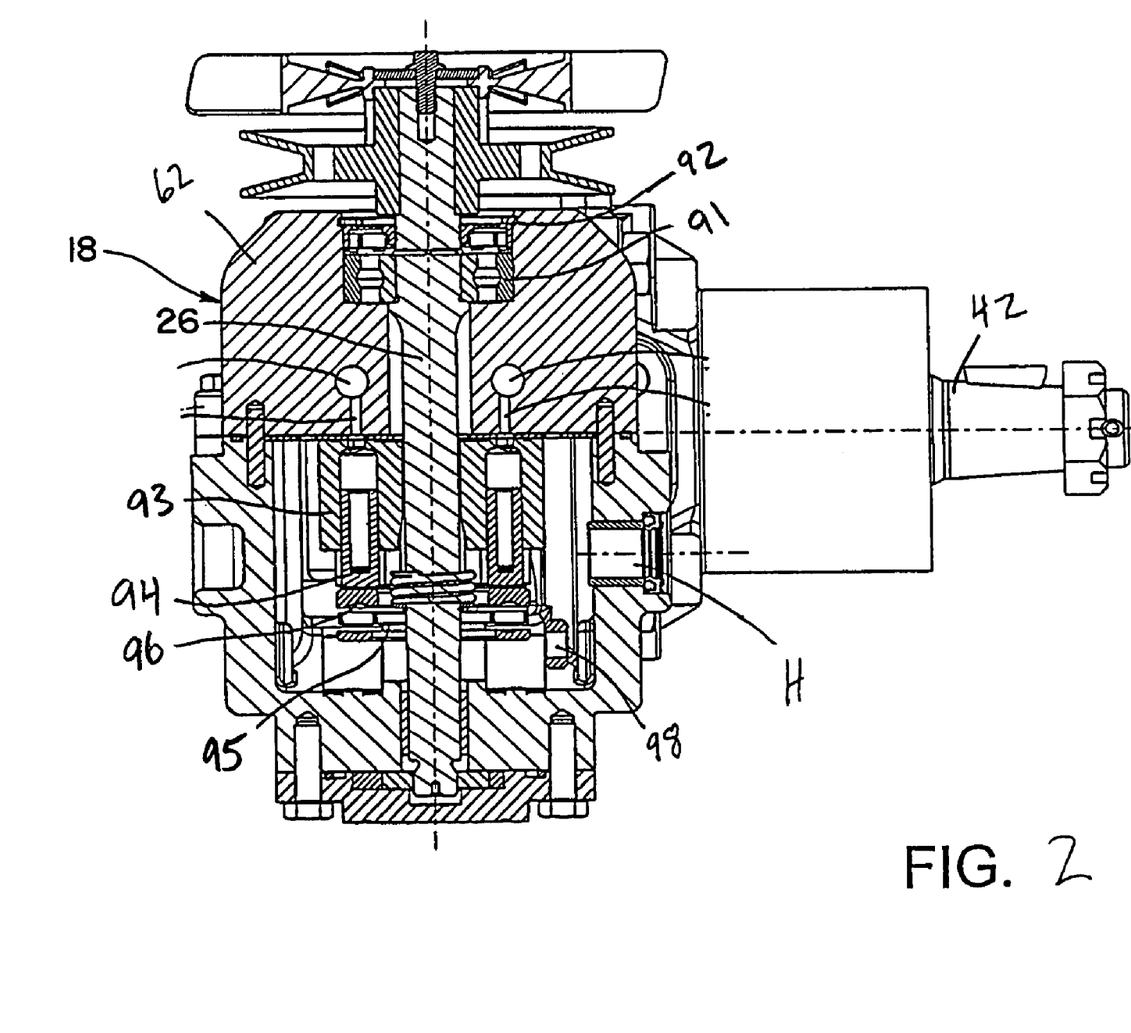
FIG. 2 is a cross-sectional view of the hydraulic drive apparatus of FIG. 1.

Referring now to the drawings in detail and initially to FIGS. 1 and 2, an exemplary hydraulic drive apparatus is indicated generally by reference numeral 10. The hydraulic drive apparatus 10 is an integrated hydrostatic transmission (herein referred to as IHT) that comprises a housing 14 containing a reversible pump 18 fluidly connected to a motor 22 in a closed loop hydraulic circuit. An input shaft 26 (FIG. 2) for driving the pump 18 extends vertically from a top 30 of the housing 14 and includes a fan 34 and pulley 38. The pulley 38 can be connected by a belt to a prime mover, such as an internal combustion engine (not shown) of a vehicle, for turning the input shaft 26. An output shaft 42 driven by the motor 22 extends horizontally from a side of the housing 14. As will be appreciated, the pump 18 supplies pressurized hydraulic fluid to an inlet of the motor 22 for driving the output shaft 42.

IHT 10 can be mounted to a frame 43 of a vehicle, generally indicated by reference number 44, using bolt holes 45 through which bolts can extend to secure the IHT 10 to the vehicle frame 43. A wheel 46 can be mounted to an outer axle portion of the output shaft 42 of the IHT 10 for supporting the vehicle 44 for movement over the ground. In the illustrated embodiment, the output shaft 42 has a tapered portion provided with a key 54 that engages in a key slot in the hub of a wheel 46 so that the wheel 46 will rotate with the output shaft 42. The wheel 46 can be secured in place by means of a nut 58 which is threaded onto the end of the axle output shaft 42.

The housing 14 of the IHT 10 includes an upper housing part 62 and a lower housing part 66 secured together with bolts 70, or by other suitable means. A sealing gasket 72 is typically provided at the interface of the upper housing portion 62 and the lower housing portion 66. The upper housing portion 62 and the lower housing portion 66 together form a generally circular opening into which the motor 22 is received. The opening is closed by a mounting plate 74 that carries the motor 22. The mounting plate 74 is secured to the upper housing portion 62 and the lower housing portion 66 by bolts 78, or by other suitable means. The mounting plate 74 may be provided with a bypass valve 76 for creating a short fluid circuit in the motor 22 to allow free rotation of the output shaft 42 when desired.

The upper housing portion 62, the lower housing portion 66, and the mounting plate 74 together form a sealed interior space of the housing 14 that contains the motor 18 and pump 22. The interior of the housing 14 serves as a shared sump for the motor 18 and the pump 22, and further may function as a reservoir.

The housing 14 further includes cooling fins 82 at various locations, generally on the top surface 30 near the fan 34, for assisting in dissipating heat generated during operation of the pump 18 and motor 22 of the IHT 10. The housing 14 can further include an externally mounted oil filter 86 for filtering the hydraulic fluid of the IST 10. The externally mounted oil filter 86 can be easily accessed for replacement when the filter becomes dirty. A breather 90 is provided for allowing air to exit and enter the housing 14 as necessary to compensate for thermal expansion and contraction of the hydraulic fluid. The breather 90 can also function as a fill cap for adding hydraulic fluid to the shared sump. Although not shown, a drain plug can be included at the bottom of the housing 14 for draining the hydraulic fluid so that fresh hydraulic fluid can be added to the housing 14.

In the illustrated embodiment, the pump 18 is a variable flow reversible piston pump. The input shaft 26 is supported in the upper housing portion 62 by a bearing 91, and a seal 92 is provided to seal the shaft 26 to the housing 14 to prevent fluid from escaping from the interior of the housing 14. A cylinder barrel 93 having a plurality of pistons 94 mounted for reciprocal movement therein is coupled to the input shaft 26 for rotation therewith. The input shaft 26 is supported by a thrust bearing 95 below a swash block 96 (also commonly referred to as a swash plate).

The swash block 96 is arranged such that the pistons 94 of the cylinder barrel 93 abut its upper surface. As will be appreciated, the swash block 96 can be inclined in first and second directions from a neutral position, or zero-inclination. Inclining the swash block 96 in the first direction (e.g., a forward position) results in the pump 18 pumping fluid in a first direction, while inclining the swash block 96 in the opposite direction (e.g., a reverse position) results in the pump 18 pumping fluid in the opposite direction.

Figure 3:
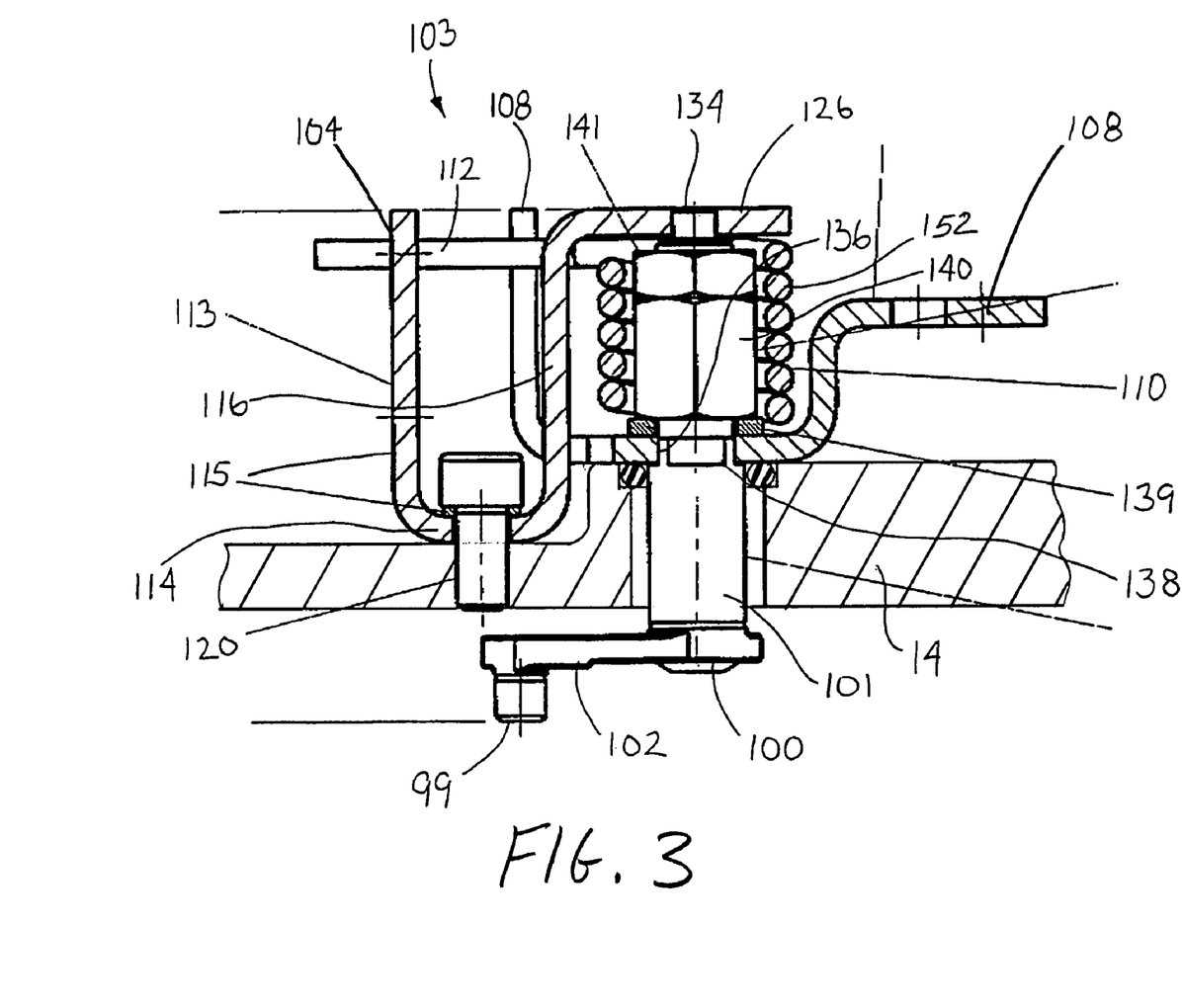
FIG. 3 is a cross-sectional view of the speed control mechanism.

As seen in FIG. 2, the swash block 96 has a cam slot 98 for receiving a cam pin 99 of a trunnion arm 100 shown in FIG. 3 (trunnion arm 100 not shown in FIG. 2). The trunnion arm 100 includes a trunnion shaft 101 and a linkage 102 provided with the cam pin 99 at an end thereof for connecting the linkage 102 to the cam slot 98 in the swash block 96. As best seen in FIG. 1, the trunnion shaft 101 is rotatably mounted in a wall of the housing 14 by a bushing and protrudes from the housing 14 through a hole H in the lower housing part 66. It will be appreciated that the inclination of the swash block 96 is controlled by rotation of the trunnion arm 100. For a further description of the linkage between the trunnion arm 100 and the swash block 96, reference may be had to U.S. Pat. No. 6,772,591, which is hereby incorporated herein by reference.

In accordance with the present invention, a speed adjusting mechanism 103 is provided for controlling the swash block 96. The speed adjusting mechanism 103 also functions as a return to neutral mechanism for biasing and returning the swash block 96 to the neutral position after the swash block 96 has been moved to at least one of the forward or reverse positions. It will be appreciated that, although not shown in FIGS. 1 and 2, the speed adjusting mechanism 103 can be mounted to the housing 14 and connected to trunnion shaft 101, as will now be described.

Figure 4:
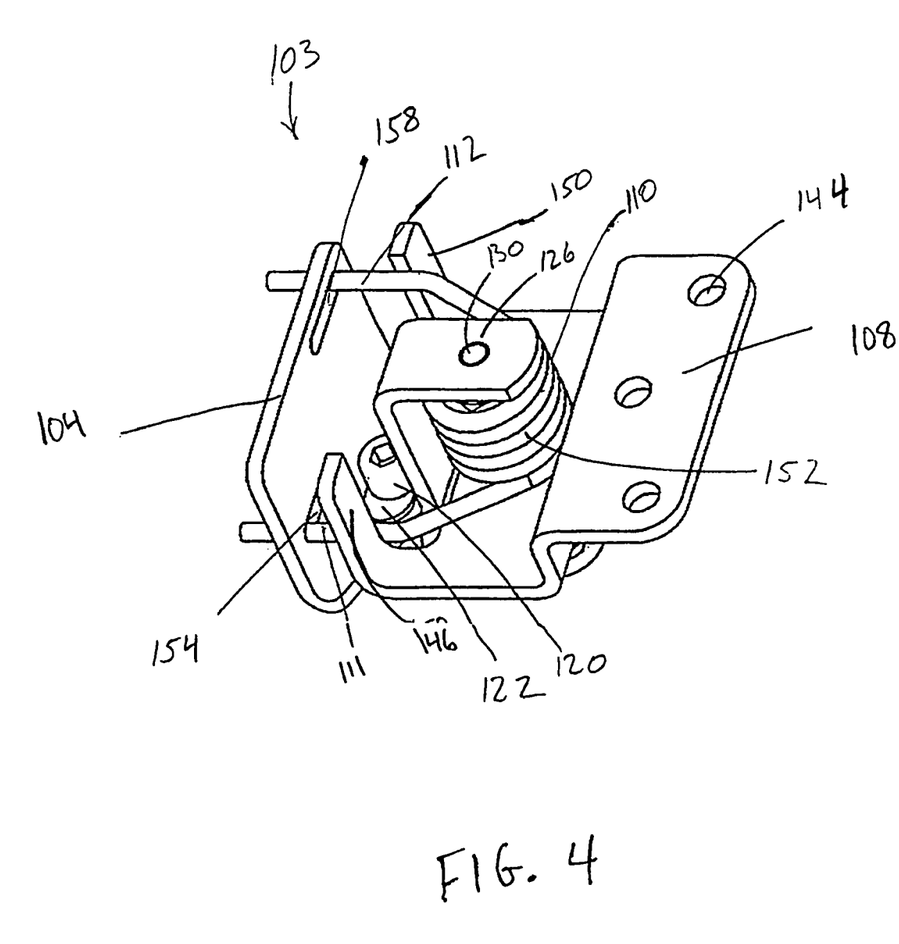
FIG. 4 is a perspective view of the speed control mechanism of FIG. 3.

As shown in FIGS. 3 and 4, the speed adjusting mechanism 103 comprises a return member 104 and a control arm 108. The return member 104 and control arm 108 are operatively coupled together by a torsion spring 110 having first and second spring legs 111 and 112. The torsion spring 110 is configured to bias and return the control member 108, and consequently the swash block 96, to the neutral position.

The return member 104 has a generally U-shape portion 113 having a bottom 114 and opposed side walls 115 and 116. The bottom 116 of the U-shape portion 113 has an opening for passage of a fastener, such as a screw 120, that is used to secure the return arm 104 to the housing 14. Preferably, the opening is a slot 122 to provide for angular adjustment of the return member 104 relative to the rotational axis of the trunnion shaft 101 so that the return member 104 can be adjusted to correspond to the neutral position of the trunnion arm 100. The return member 104 also has a trunnion mount portion 126 that extends laterally from the top of side wall 116 of the U-shape portion 113. The trunnion mount portion 126 has a hole 130 into which a spindle portion 134 on an axially outer end of the trunnion shaft 101 extends to define a pivot axis for the above noted angular adjustment of the return member 104. The screw 122 and the spindle portion 134 of the trunnion shaft 101 that extends into the hole 130 of the return member 104 fix the return member 104 against rotational movement relative to the housing 14.

The control arm 108 is mounted at a central portion thereof to the trunnion shaft 101 and fixed for rotation therewith by a square slot 136 in the control arm 108 that engages a square portion 138 of the trunnion shaft 101. Although typically the square slot 136 and square portion 138 are of corresponding shape, any other non-circular configuration can be used to prevent relative rotation between the control arm 108 and the trunnion shaft 101. For example, the control arm 108 and trunnion shaft 101 can be keyed together. A washer 139, a nut 140, and a lock nut 141 are provided for securing the control arm 108 to the trunnion shaft 101. The nut 140 and lock nut 141 are threaded onto a threaded shank portion 142 (FIG. 1, threads not shown) of the trunnion shaft 101. Holes 144 are provided for connection of the control arm 108 to a cable or other linkage that may extend to a speed control lever, pedal, or other suitable control device that can be operated by the vehicle operator.

The control arm 108 also has laterally spaced apart abutments, hereinafter referred to as ears 146 and 150, that extend from the central portion of the control arm 108 for engaging respective legs 111 and 112 of the torsion spring 110, as hereinafter described.

The torsion spring 110 has a central coil portion 152 that is mounted coaxial with the trunnion shaft 101 between the trunnion mount portion 126 of the return member 104 and the control arm 108. As shown in FIGS. 3 and 4, the central coil portion 152 surrounds the nut 140 and lock nut 141. The first and second legs 111 and 112 of the torsion spring 110 extend from opposite ends of the central coil portion 152 of the torsion spring 110 and have generally parallel end portions that pass through respective slots 154 and 158 in the sidewall 115 of the U-shape portion 113 of the return member 104. The outer ends of the slots 154 and 158 serve as positive stops for preventing any movement of respective legs 111 and 112 beyond the slot. However, either leg 111 and 112 od the spring 110 can be moved inwardly toward the other in the opposite direction with the slot guiding movement of the leg of the spring in a plane perpendicular to the axis of the trunnion shaft 101.

The legs 111 and 112 of the spring 110 also are engaged by the ears 146 and 150 of the control arm 108. The ears 146 and 150 are laterally spaced apart such that an inner side of each ear engages an outer side of a respective leg of the spring 110. Consequently, when the control member 108 is rotated clockwise, ear 146 will engage and urge leg 111 of the torsion spring 110 inwardly against the biasing force, while the other ear 150 is free to move away from leg 112 of the torsion spring 110. Upon release of the control member 108, the biasing force of the spring 110 will cause spring leg 111 to urge ear 146 counterclockwise until leg 111 reaches the outer end of the slot 154. Conversely, when the control arm 108 is rotated counterclockwise, ear 150 will engage and urge leg 112 of the torsion spring 110 inwardly against the biasing force, while the other ear 146 is free to move away from leg 111 of the torsion spring 110. Upon release of the control member 108, the biasing force of the spring 110 will cause spring leg 112 to urge ear 150 clockwise until spring leg 112 reaches the outer end of the slot 158.

It will now be appreciated that the speed adjusting mechanism 103 as described above generally maintains the pump 18 in its neutral position until the control arm 108 is moved to a forward or reverse position, and returns the pump 18 to neutral after the control arm 108 has been moved to at least one of the forward or reverse positions.

In some applications, it can be desirable to have the speed adjusting mechanism 103 return the pump 18 to neutral from only one of the operating directions. As an example, in some applications it may be desirable to only return the pump 18 to neutral when it is operated in the reverse direction. To achieve unidirectional return to neutral functionality, one of the ears 146 and 150 can be removed or reduced in length such that it does not engage a respective leg of the torsion spring 110 when the control arm 108 is rotated. As such, the control arm 108 can freely rotate independent of the torsion spring 110 in one direction, while when rotated in the other direction the remaining ear engages the respective leg of the torsion spring and functions to return the pump 18 to neutral as described above. As an alternative to removing or reducing in length an ear of the control arm 108, one of ears 146 or 150 can include a slot or notch into which a respective spring leg can extend when the control arm 108 is rotated to thereby prevent loading of the torsion spring 110.

It will be appreciated that the hydraulic drive apparatus of the present invention can be a hydrostatic transmission as described in detail above, or may be a hydraulic pump, hydraulic pump unit, or any other hydraulic drive apparatus as desired. The Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic drive apparatus, comprising
a casing having a hydraulic pump mounted therein, the hydraulic pump including a movable control member for controlling the output of the pump;
a rotatable shaft coupled to the control member and extending from the casing;
a speed adjusting mechanism mounted to the casing and drivingly coupled to the rotatable shaft, the speed adjusting mechanism comprising:
a return member mounted to the casing;
a control arm engaged to the rotatable shaft and movable between forward and reverse positions to move the control member between forward and reverse positions, respectively; and
a torsion spring operatively coupled to the return member and the control arm for biasing and returning the control arm to a neutral position after the control arm has been moved to at least one of the forward or reverse positions,
wherein the return member includes at least one spring stop for preventing outward movement of at least one leg of the torsion spring when the control arm is rotated in a first direction while permitting inward movement of the at least one leg of the torsion spring when the control arm is rotated in a second direction opposite the first direction, and
wherein the at least one spring stop is a slot in the return member through which the at least one leg of the torsion spring extends.

2. A hydraulic drive apparatus, comprising
a casing having a hydraulic pump mounted therein, the hydraulic pump including a movable control member for controlling the output of the pump;
a rotatable shaft coupled to the control member and extending from the casing;
a speed adjusting mechanism mounted to the casing and drivingly coupled to the rotatable shaft, the speed adjusting mechanism comprising:
a return member mounted to the casing;
a control arm engaged to the rotatable shaft and movable between forward and reverse positions to move the control member between forward and reverse positions, respectively; and
a torsion spring operatively coupled to the return member and the control arm for biasing and returning the control arm to a neutral position after the control arm has been moved to at least one of the forward or reverse positions,
wherein the control arm includes at least one abutment for engaging and urging a first leg of the torsion spring toward a second leg of the torsion spring against the biasing force of the torsion spring when the control arm is rotated in a first direction.

3. A hydraulic drive apparatus as set forth in claim 2, wherein the return member includes at least one spring stop for preventing outward movement of at least one leg of the torsion spring when the control arm is rotated in a first direction while permitting inward movement of the at least one leg of the torsion spring when the control arm is rotated in a second direction opposite the first direction.

4. A hydraulic drive apparatus as set forth in claim 2, wherein the return member includes first and second spring stops, the first spring stop preventing outward movement of a first leg of the torsion spring and the second spring stop permitting inward movement of a second leg of the torsion spring when the control arm is rotated in a first direction, the first spring stop permitting inward movement of the first leg of the torsion spring and the second stop preventing outward movement of the second leg of the torsion spring when the control arm is rotated in a second direction opposite the first direction.

5. A hydraulic drive apparatus as set forth in claim 2, wherein the at least one abutment includes laterally spaced apart first and second abutments for engaging and urging the first and second legs of the torsion spring, the first abutment configured to engage and urge the first leg of the torsion spring to cause it to move inwardly against the biasing force of the torsion spring when the control arm is rotated in a first direction, the second abutment configured to engage and urge the second leg of the torsion spring to cause it to move inwardly against the biasing force of the torsion spring when the control arm is rotated in a second direction opposite the first direction.

6. A hydraulic drive apparatus as set forth in claim 2, wherein the torsion spring is mounted coaxially with the rotatable shaft.

7. A hydraulic drive apparatus as set forth in claim 2, in combination with a vehicle including a frame, the hydraulic drive apparatus being mounted to the frame.

8. A hydraulic drive apparatus, comprising
a casing having a hydraulic pump mounted therein, the hydraulic pump including a movable control member for controlling the output of the pump;
a rotatable shaft coupled to the control member and extending from the casing;
a speed adjusting mechanism mounted to the casing and drivingly coupled to the rotatable shaft, the speed adjusting mechanism comprising:
a return member mounted to the casing;
a control arm engaged to the rotatable shaft and movable between forward and reverse positions to move the control member between forward and reverse positions, respectively; and
a torsion spring operatively coupled to the return member and the control arm for biasing and returning the control arm to a neutral position after the control arm has been moved to at least one of the forward or reverse positions,
wherein the control arm includes at least one abutment for engaging and urging a first leg of the torsion spring toward a second leg of the torsion spring, wherein the torsion spring biases and returns the control arm to neutral after the control arm is rotated in a first direction, and wherein the at least one abutment of the control arm can rotate independent of the first leg of the torsion spring when the control arm is rotated in a second direction opposite the first direction.

9. A hydraulic drive apparatus, comprising
a casing having a hydraulic pump mounted therein, the hydraulic pump including a movable control member for controlling the output of the pump;
a rotatable shaft coupled to the control member and extending from the casing;

a speed adjusting mechanism mounted to the casing and drivingly coupled to the rotatable shaft, the speed adjusting mechanism comprising:

a return member mounted to the casing;

a control arm engaged to the rotatable shaft and movable between forward and reverse positions to move the control member between forward and reverse positions, respectively; and a torsion spring operatively coupled to the return member and the control arm for biasing and returning the control arm to a neutral position after the control arm has been moved to at least one of the forward or reverse positions, wherein the return member includes a slot for adjustably mounting the return member to the casing with a screw.

10. A speed adjusting mechanism for a hydraulic drive apparatus including a casing having a hydraulic pump mounted therein and a trunnion arm extending outside the casing and being rotatable for controlling the output of the pump, comprising:

a return member mountable to the casing;

a control arm connectable to the trunnion arm and movable between forward and reverse positions to move the trunnion arm between forward and reverse positions, respectively; and a torsion spring operatively coupled to the return member and the control arm for biasing and returning the control arm to a neutral position after the control arm has been moved to at least one of the forward or reverse positions, wherein the return member includes at least one spring stop for preventing outward movement of at least one leg of the torsion spring when the control arm is rotated in a first direction while permitting inward movement of the at least one leg of the torsion spring when the control arm is rotated in a second direction opposite the first direction, and wherein the at least one spring stop is a slot in the return member through which the at least one leg of the torsion spring extends.

11. A speed adjusting mechanism for a hydraulic drive apparatus including a casing having a hydraulic pump mounted therein and a trunnion arm extending outside the casing and being rotatable for controlling the output of the pump, comprising:

a return member mountable to the casing;

a control arm connectable to the trunnion arm and movable between forward and reverse positions to move the trunnion arm between forward and reverse positions, respectively; and a torsion spring operatively coupled to the return member and the control arm for biasing and returning the control arm to a neutral position after the control arm has been moved to at least one of the forward or reverse positions, wherein the control arm includes at least one abutment for engaging and urging a first leg of the torsion spring toward a second leg of the torsion spring against the biasing force of the torsion spring when the control arm is rotated in a first direction.

12. A speed adjusting mechanism for a hydraulic drive apparatus as set forth in claim 11, wherein the return member includes at least one spring stop for preventing outward movement of at least one leg of the torsion spring when the control arm is rotated in a first direction while permitting inward movement of the at least one leg of the torsion spring when the control arm is rotated in a second direction opposite the first direction.

13. A speed adjusting mechanism for a hydraulic drive apparatus as set forth in claim 11, wherein the return member includes first and second spring stops, the first spring stop preventing outward movement of a first leg of the torsion spring and the second spring stop permitting inward movement of a second leg of the torsion spring when the control arm is rotated in a first direction, the first spring stop permitting inward movement of the first leg of the torsion spring and the second stop preventing outward movement of the second leg of the torsion spring when the control arm is rotated in a second direction opposite the first direction.

14. A speed adjusting mechanism for a hydraulic drive apparatus as set forth in claim 11, wherein the control arm includes laterally spaced apart first and second of abutments for engaging and urging the first and second legs of the torsion spring, the first abutment configured to engage and urge the first leg of the torsion spring to cause it to move inwardly against the biasing force of the torsion spring when the control arm is rotated in a first direction, the second abutment configured to engage and urge the second leg of the torsion spring to cause it to move inwardly against the biasing force of the torsion spring when the control arm is rotated in a second direction opposite the first direction.

15. A speed adjusting mechanism for a hydraulic drive apparatus as set forth in claim 11, wherein the torsion spring is mounted coaxially with the trunnion arm.

16. A speed adjusting mechanism for a hydraulic drive apparatus as set forth in claim 11, in combination with a vehicle including a frame, the hydraulic drive apparatus being mounted to the frame.

17. A speed adjusting mechanism for a hydraulic drive apparatus including a casing having a hydraulic pump mounted therein and a trunnion arm extending outside the casing and being rotatable for controlling the output of the pump, comprising:

a return member mountable to the casing;

a control arm connectable to the trunnion arm and movable between forward and reverse positions to move the trunnion arm between forward and reverse positions, respectively; and a torsion spring operatively coupled to the return member and the control arm for biasing and returning the control arm to a neutral position after the control arm has been moved to at least one of the forward or reverse positions, wherein the control arm includes at least one abutment for engaging and urging a first leg of the torsion spring toward a second leg of the torsion spring, wherein the torsion spring biases and returns the control arm to neutral after the control arm is rotated in a first direction and wherein the at least one abutment of the control arm can rotate independent of the first leg of the torsion spring when the control arm is rotated in a second direction opposite the first direction.

18. A speed adjusting mechanism for a hydraulic drive apparatus including a casing having a hydraulic pump mounted therein and a trunnion arm extending outside the casing and being rotatable for controlling the output of the pump, comprising:

a return member mountable to the casing;

a control arm connectable to the trunnion arm and movable between forward and reverse positions to move the trunnion arm between forward and reverse positions, respectively; and a torsion spring operatively coupled to the return member and the control arm for biasing and returning the control arm to a neutral position after the control arm has been moved to at least one of the forward or reverse positions, wherein the return member includes a slot for adjustable mounting of the return member to the casing with a screw.

* * * * *